United States Patent [19]

Masuda

[11] Patent Number: 5,151,593
[45] Date of Patent: Sep. 29, 1992

[54] IMAGE READING APPARATUS WITH CORRECTED OPTICAL LENGTH

[75] Inventor: Yoshitaka Masuda, Yokohama, Japan

[73] Assignee: Canon Kabushiki Kaisha, Tokyo, Japan

[21] Appl. No.: 701,015

[22] Filed: May 13, 1991

Related U.S. Application Data

[63] Continuation of Ser. No. 529,545, May 29, 1990, abandoned.

[30] Foreign Application Priority Data

Jun. 1, 1989 [JP] Japan ................................. 1-140000

[51] Int. Cl.⁵ .............................................. H01J 3/14
[52] U.S. Cl. ..................................... 250/234; 355/45
[58] Field of Search ................ 250/234, 235; 358/497; 355/44, 45

[56] References Cited

U.S. PATENT DOCUMENTS 4,619,519  10/1986  Takahashi et al. ................... 355/44
4,894,681  1/1990  Watanabe et al. ..................... 355/45

FOREIGN PATENT DOCUMENTS 62-239657  10/1987  Japan .

*Primary Examiner*—David C. Nelms
*Assistant Examiner*—K. Shami
*Attorney, Agent, or Firm*—Fitzpatrick, Cella, Harper & Scinto

[57] ABSTRACT

An image reading apparatus includes an illumination unit for illuminating an image, a projection unit for projecting the image illuminated by the illumination unit onto a predetermined surface, a reflection unit arranged between the projection unit and the predetermined surface, and a reading unit for reading image information of the image projected by the projection unit through the reflection unit. An optical path length between the reading unit and the reflection unit is equal to an optical path length between the reflection unit and the predetermined surface.

20 Claims, 2 Drawing Sheets

IMAGE READING APPARATUS WITH CORRECTED OPTICAL LENGTH

This application is a continuation of application Ser. No. 529,545 filed May 29, 1990, now abandoned.

BACKGROUND OF THE INVENTION

1. Field of the Invention

The present invention relates to an image reading apparatus and, more particularly, to an image reading apparatus suitable for a case wherein a transmission image of, e.g., a microfilm, an OHP (overhead projector), or the like is projected onto a screen surface using a projection system, image information is observed on the screen surface and is read by an image reading means, and the read information is printed by, e.g., a digital printer.

2. Related Background Art

There are proposed various image reading apparatuses each of which enlarges and projects a transmission image of, e.g., a microfilm onto a screen surface using a projection system to observe the projected image, reads image information projected onto the screen surface using an image reading means comprising a linear image sensor as a linear light-receiving element sensor, and prints it using a digital printer.

FIG. 1 is a schematic diagram of a conventional image reading apparatus of this type.

In FIG. 1, a transmission image 1 illuminated by an illumination system 11 is enlarged and projected onto the surface of a screen 6 via mirrors 2, 3, and 5 by a projection system 12. Image information projected onto the surface of the screen 6 is observed.

When image information projected onto the surface of the screen 6 is to be copied, an image reading means 7 arranged adjacent to the surface of the screen 6 scans along the surface of the screen 6 in a direction of an arrow 10, so that the image information is photoelectrically read by a linear image sensor. The read image information is printed by, e.g., a digital printer.

In the conventional image reading apparatus shown in FIG. 1, image information projected onto the surface of the screen 6 is photoelectrically read by a light-receiving element 7a of the image reading means 7.

In general, the light-receiving element 7a is optically located in front of the surface of the screen 6 to be separated therefrom by a given distance.

Therefore, image information defocused by a predetermined amount is formed on the surface of the light-receiving element 7a unlike the image information projected onto the surface of the screen 6.

For this reason, when the light-receiving element 7a scans on the surface of the screen 6 to read image information, a magnification error occurs based on the defocus amount, and it is difficult to accurately read image information without causing a magnification error over the entire surface.

SUMMARY OF THE INVENTION

It is therefore an object of the present invention to provide an image reading apparatus in which a mirror is arranged in front of a light-receiving surface of an image reading means, and image information projected onto a screen surface is read through the mirror or by moving at least one mirror of a projection system, so that image information can be accurately read over the entire surface without causing a magnification error and distortion.

In an image reading apparatus of the present invention, when an image illuminated with an illumination system is projected onto a screen surface through a reflection means and image information projected onto the screen surface is read by an image reading means by scanning the image reading means arranged adjacent to the screen surface along the screen surface, a mirror is arranged in front of the image reading means, so that an optical path length from the image to the image reading means becomes substantially equal to an optical path length from the image to the screen surface, or at least one mirror constituting the reflection means is moved.

DESCRIPTION OF THE PREFERRED EMBODIMENTS

Figure 1:
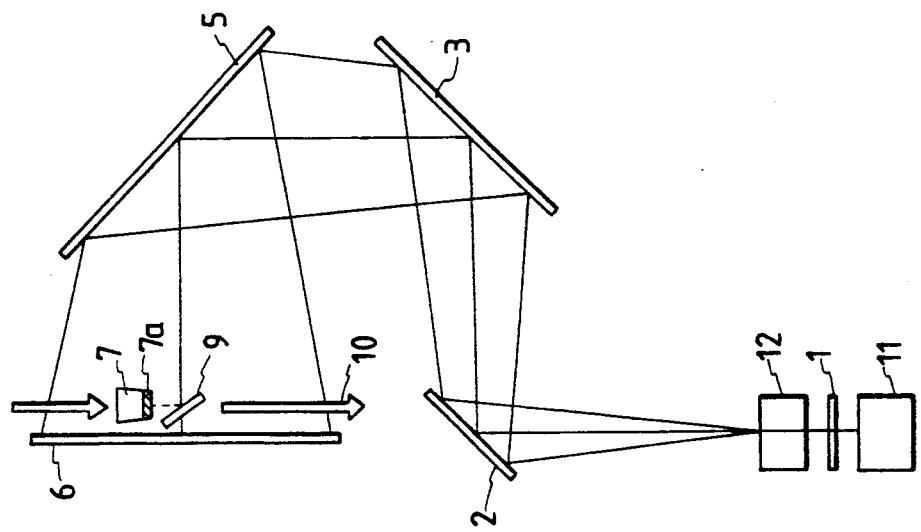
FIG. 1 is a schematic diagram of a conventional image reading apparatus.
Figure 2:
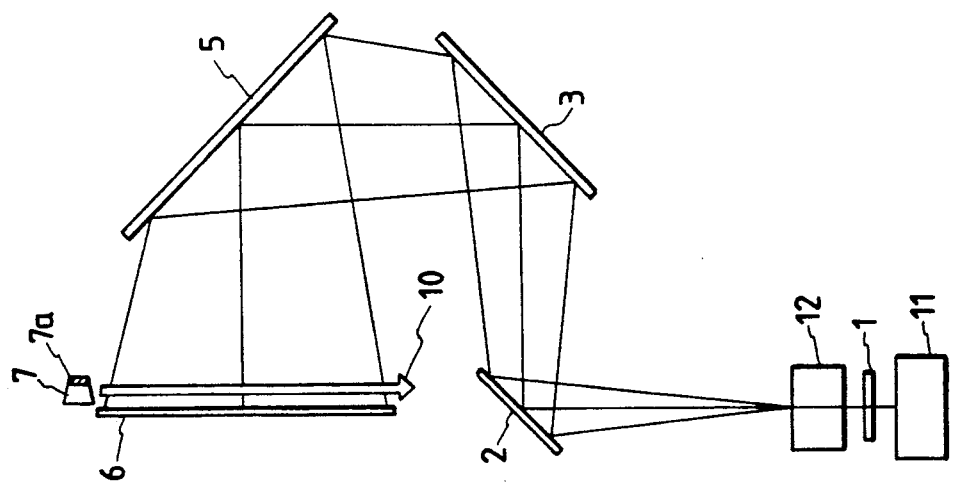
FIGS. 2 and 3 are respectively schematic diagrams of main parts of the first and second embodiments of an image reading apparatus according to the present invention.

FIG. 2 is a schematic diagram of the first embodiment of an image reading apparatus of the present invention.

In FIG. 2, a transmission image 1 of, e.g., a microfilm, an OHP, or the like is read.

An illumination system 11 illuminates the image 1. A projection system 12 causes mirrors 2, 3, and 5 constituting a reflection means to reflect the image 1 illuminated by the illumination system 11, and then enlarges and projects the image onto the surface of a transmission screen 6.

Image information enlarged and projected onto the surface of the screen 6 is observed.

An image reading means 7 is arranged adjacent to the surface of the screen 6, and comprises a light-receiving means in which a plurality of linear light-receiving elements are arranged in a direction perpendicular to the surface of the drawing. The image reading means 7 has a light-receiving surface 7a. A mirror 9 is arranged in front of the light-receiving surface 7a to compensate for a difference in optical path length caused by the fact that the image reading means 7 is arranged in front of the screen 6. Thus, an optical path length from the image 1 to the light-receiving surface 7a becomes substantially equal to an optical path length from the image 1 to the screen 6.

More specifically, with the use of the mirror 9, the optical path length from the light-receiving surface of the image reading means 7 to the mirror 9 is substantially equal to the optical path length from the mirror 9 to the screen 6.

The image reading means 7 and the mirror 9 are moved together by a driving means (not shown) such as a guide rail or a driving wire along the surface of the screen 6, i.e., to be parallel to the surface of the screen 6, as indicated by an arrow 10, thereby reading image information on the surface of the screen 6.

In this embodiment, the mirror 9 is arranged in front of the light-receiving surface 7a to satisfy the above-mentioned condition, as shown in FIG. 2, to adjust the optical path lengths between the image 1 and the light-receiving surface 7a and between the image 1 and the surface of the screen 6. Thus, image information optically equivalent to that projected onto the surface of the screen 6 can be photoelectrically read on the light-receiving surface 7a.

Image information on the entire surface of the screen can be accurately read to be free from a magnification error or distortion, and can be printed by a digital printer, e.g., a laser beam printer, an ink-jet printer, or the like.

Figure 3:
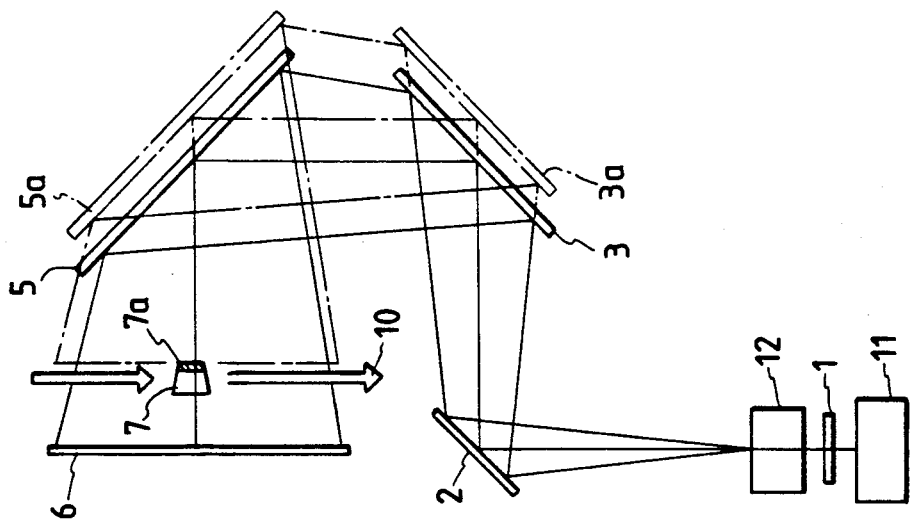

FIG. 3 is a schematic diagram of the second embodiment of an image reading apparatus according to the present invention.

In this embodiment, in place of the mirror 9 arranged in front of the light-receiving surface 7a in the first embodiment shown in FIG. 2, some mirrors, e.g., 3 and 5 constituting the reflection means are movably arranged to adjust optical path lengths.

More specifically, when the image 1 illuminated by the illumination system 11 is enlarged and projected onto the surface of the screen 6 by the projection system 12, the mirrors 3 and 5 are arranged at solid line positions, thereby projecting image information onto the surface of the screen 6.

When image information projected onto the surface of the screen 6 is read by the image reading means 7, the mirrors 3 and 5 are parallelly moved to positions 3a and 5a indicated by alternate long and short dashed lines by a mirror moving means (not shown), so that an optical path length from the image 1 to the light-receiving surface 7a becomes substantially equal to an optical path length from the image 1 to the surface of the screen 6.

Like in the first embodiment shown in FIG. 2, the image reading means 7 can read image information optically equivalent to that projected onto the surface of the screen 6.

In this embodiment, a distance between the image reading means 7 and the surface of the screen 6 can be arbitrarily set since the mirrors 3 and 5 need only be moved according to the distance.

In this embodiment, the mirrors 3 and 5 are moved to adjust optical path lengths. However, any other methods may be adopted as long as an optical path length between the image 1 and the light-receiving surface 7a can become substantially equal to an optical path length between the image 1 and the surface of the screen 6. For example, the projection system 12 and the image 1 may be moved, or at least one mirror may be moved.

In this embodiment, the mirrors 3 and 5 are moved to adjust optical path lengths. This is to change a projection position of an image projected by the projection system. When the mirrors are arranged at their first positions (mirrors 3 and 5), an image is projected onto the surface of the screen 6 by the projection system 12. When the mirrors are arranged at their second positions (mirrors 3a and 5a), an image is projected by the projection system 12 onto a position different from the surface of the screen 6, and the projected image information is read by the image reading means 7.

In this embodiment, a transmission image is projected by the projection system onto the surface of the screen. The present invention can also be applied to an apparatus for projecting a reflected image.

Figure 4:
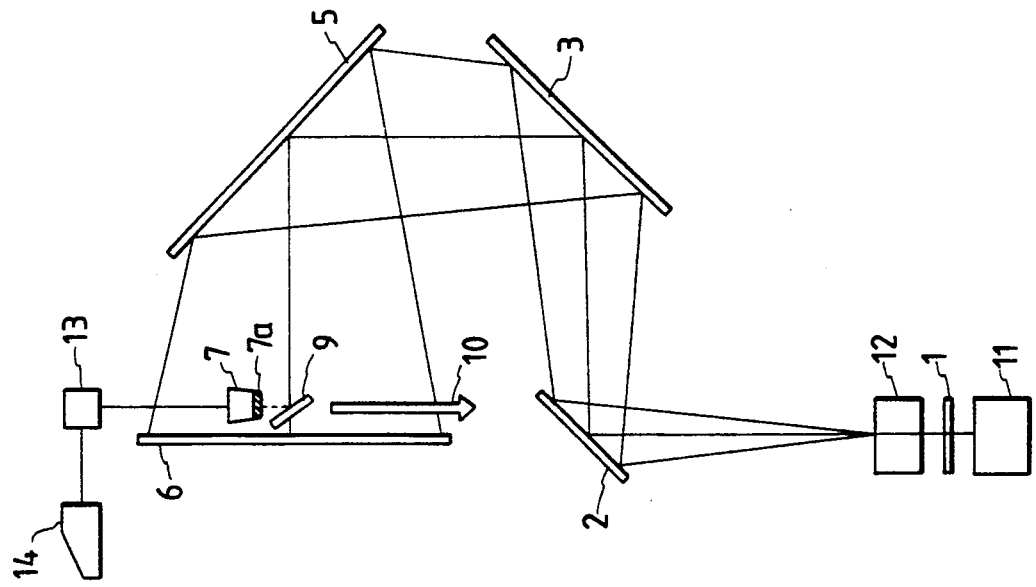
FIG. 4 is a schematic diagram of a main part of an embodiment of an image information processing apparatus according to the present invention.

FIG. 4 is a schematic diagram of an embodiment of an image information processing apparatus using an image reading apparatus of the present invention. The same reference numerals in this embodiment denote the same parts as in the embodiment shown in FIG. 2, and a detailed description thereof will be omitted. An image processing means 13 processes image information read by an image reading means 7. A printer 14 outputs the image information processed by the image processing means.

In this manner, a mirror is arranged in front of the light-receiving surface of the image reading means, and image information projected onto the screen surface is read via the mirror, so that image information can be accurately read over the entire surface to be free from magnification error and distortion.

For this reason, image information can be satisfactorily read, and as a result, image information can be satisfactorily output.

The image processing means 13 and the printer 14 shown in FIG. 4 may be applied to the apparatus shown in FIG. 3.

An image reading apparatus of the present invention comprises illumination means for illuminating an image, projection means for projecting the image illuminated by the illumination means onto a predetermined surface, reflection means arranged between the projection means and the predetermined surface, and reading means for reading image information of the image projected by the projection means through the reflection means, an optical path length between the reading means and the reflection means being equal to an optical path length between the reflection means and the predetermined surface.

An image reading apparatus of the present invention comprises illumination means for illuminating an image, projection means for projecting the image illuminated by the illumination means onto a predetermined surface, reflection means arranged between the projection means and the predetermined surface, and reading means for reading image information of the image projected by the projection means through the reflection means, an optical path length between the reading means and the image being equal to an optical path length between the image and the predetermined surface.

An image reading apparatus of the present invention comprises illumination means for illuminating an image, projection means for projecting the image illuminated by the illumination means, reading means for reading image information of the image projected by the projection means, and reflection means for reflecting the image projected by the projection means. The reflection means is movable. When the reflection means is arranged at a first position, the projection means projects the image onto a predetermined surface through the reflection means arranged at the first position, and when the reflection means is arranged at a second position different from the first position, the reading means reads image information of the image projected by the projection means through the reflection means arranged at the second position.

An image reading apparatus of the present invention comprises illumination means for illuminating an image, projection means for projecting the image illuminated by the illumination means, reading means for reading image information of the image projected by the projection means, and projection position change means for changing a projection position of the image projected by the projection means. When the image is projected at a first position by the projection position change means, the image is projected onto a screen surface by the projection means. When the image is projected at a second position different from the first position by the projection position change means, the reading means reads image information of the image projected by the projection means.

An image reading method of the present invention comprises the step of causing illumination means to illuminate an image, the step of causing projection means to project an image illuminated by the illumination means onto a predetermined surface, the step of arranging reflection means between the projection means and the predetermined surface, and the step of causing reading means to read image information of the image projected by the projection means through the reflection means, wherein an optical path length between the reading means and the reflection means is equal to an optical path length between the reflection means and the predetermined surface.

An image reading method of the present invention comprises the step of causing illumination means to illuminate an image, the step of causing projection means to project an image illuminated by the illumination means onto a predetermined surface, the step of arranging reflection means between the projection means and the predetermined surface, and the step of causing reading means to read image information of the image projected by the projection means through the reflection means, wherein an optical path length between the reading means and the image is equal to an optical path length between the image and the predetermined surface.

An image reading method of the present invention comprises the step of causing illumination means to illuminate an image, the step of causing projection means to project an image illuminated by the illumination means, the step of causing movable reflection means to reflect the image projected by the projection means, the step of arranging the reflection means at a first position and causing the projection means to project the image onto a predetermined surface through the reflection means, the step of arranging the reflection means at a second position different from the first position, and the step of causing reading means to read image information of the image projected by the projection means through the reflection means arranged at the second position.

An image information processing apparatus of the present invention comprises illumination means for illuminating an image, projection means for projecting the image illuminated by the illumination means onto a predetermined surface, reflection means arranged between the projection means and the predetermined surface, reading means for reading image information of the image projected by the projection means through the reflection means, and image processing means for processing the image information read by the reading means, an optical path length between the reading means and the reflection means being equal to an optical path length between the reflection means and the predetermined surface.

An image information processing apparatus of the present invention comprises illumination means for illuminating an image, projection means for projecting the image illuminated by the illumination means onto a predetermined surface, reflection means arranged between the projection means and the predetermined surface, reading means for reading image information of the image projected by the projection means through the reflection means, and image processing means for processing the image information read by the reading means, an optical path length between the reading means and the image being equal to an optical path length between the image and the predetermined surface.

An image information processing apparatus of the present invention comprises illumination means for illuminating an image, projection means for projecting the image illuminated by the illumination means, reading means for reading image information of the image projected by the projection means, reflection means for reflecting the image projected by the projection means, and image processing means for processing the image information read by the reading means. The reflection means is movable. When the reflection means is arranged at a first position, the projection means projects the image onto a predetermined surface through the reflection means arranged at the first position, and when the reflection means is arranged at a second position different from the first position, the reading means reads image information of the image projected by the projection means through the reflection means arranged at the second position.

An image information processing apparatus of the present invention comprises illumination means for illuminating an image, projection means for projecting the image illuminated by the illumination means, reading means for reading image information of the image projected by the projection means, image processing means for processing the image information read by the reading means, and projection position change means for changing a projection position of the image projected by the projection means. When the image is projected at a first position by the projection position change means, the image is projected onto a screen surface by the projection means. When the image is projected at a second position different from the first position by the projection position change means, the reading means reads image information of the image projected by the projection means.

An image information processing method of the present invention comprises the step of causing illumination means to illuminate an image, the step of causing projection means to project an image illuminated by the illumination means onto a predetermined surface, the step of arranging reflection means between the projection means and the predetermined surface, the step of causing reading means to read image information of the image projected by the projection means through the reflection means, and the step of causing image processing means to process the image information read by the reading means, wherein an optical path length between the reading means and the reflection means is equal to an optical path length between the reflection means and the predetermined surface.

An image information processing method of the present invention comprises the step of causing illumination means to illuminate an image, the step of causing projection means to project an image illuminated by the illumination means onto a predetermined surface, the step of arranging reflection means between the projection means and the predetermined surface, the step of causing reading means to read image information of the image projected by the projection means through the reflection means, and the step of causing image processing means to process the image information read by the reading means, wherein an optical path length between the reading means and the image is equal to an optical path length between the image and the predetermined surface.

An image information processing method of the present invention comprises the step of causing illumination means to illuminate an image, the step of causing projection means to project an image illuminated by the illumination means, the step of causing movable reflection means to reflect the image projected by the projection means, the step of arranging the reflection means at a first position and causing the projection means to project the image onto a predetermined surface through the reflection means, the step of arranging the reflection means at a second position different from the first position, the step of causing reading means to read image information of the image projected by the projection means through the reflection means arranged at the second position, and the step of causing image processing means to process the image information read by the reading means.

In an image reading apparatus of the present invention, when an image illuminated by an illumination system is projected by a projection system onto a screen surface through a reflection means and image information projected on the screen surface is read by scanning an image reading means arranged adjacent to the screen surface along the screen surface, a mirror is arranged in front of a light-receiving surface of the image reading means, so that an optical path length from the image to the light-receiving surface becomes substantially equal to an optical path length from the image to the screen surface.

In an image reading apparatus of the present invention, when an image illuminated by an illumination system is projected by a projection system onto a screen surface through a reflection means and image information projected on the screen surface is read by scanning an image reading means arranged adjacent to the screen surface along the screen surface, at least one mirror constituting the reflection means is moved so that an optical path length from the image to the light-receiving surface becomes substantially equal to an optical path length from the image to the screen surface.

According to the present invention, there is provided an image forming apparatus wherein when image information projected onto the screen surface is read by the image reading means arranged in front of the screen, an optical path length from the image to the light-receiving surface is set by the above-mentioned means to be substantially equal to an optical path length from the image to the screen surface, so that the image can be accurately read over the entire surface of the screen to be free from distortion and magnification error, and can be printed by, e.g., a digital printer.

What is claimed is:

1. An image reading apparatus, comprising:
   illumination means for illuminating an image;
   projection means for projecting the image illuminated by said illumination means onto a predetermined surface;
   reflection means arranged between said projection means and said predetermined surface; and
   reading means for reading image information of the image projected by said projection means and deflected by said reflection means, an optical path length between said reading means and said reflection means being equal to an optical path length between said reflection means and said predetermined surface, wherein said reflection means and said reading means are arranged adjacent to said predetermined surface.

2. An apparatus according to claim 1, wherein said reflection means and said reading means are integrally arranged.

3. An image reading apparatus, comprising:
   illumination means for illuminating an image;
   projection means for projecting the image illuminated by said illumination means onto a predetermined surface;
   reflection means arranged between said projection means and said predetermined surface; and
   reading means for reading image information of the image projected by said projection means and deflected by said reflection means, an optical path length between said reading means and the image being equal to an optical path length between the image and said predetermined surface, wherein said reflection means and said reading means are arranged adjacent to said predetermined surface.

4. An apparatus according to claim 3, wherein said reflection means and said reading means are integrally arranged.

5. An image reading apparatus comprising:
   illumination means for illuminating an image:
   projection means for projecting the image illuminated by said illumination means;
   a screen surface which the image is projected onto by said projection means;
   reading means for reading image information of the image projected by said projection means, said reading means arranged adjacent to said screen surface; and
   projection position change means for changing a projection position of the image projected by said projection means,
   wherein when the image is projected at a first position by said projection position change means, the image is projected onto a screen surface by said projection means, and
   when the image is projected at a second position different form the first position by said projection position change means, said reading means read image information of the image projected by said projection means.

6. An image information processing apparatus, comprising:
   illumination means for illuminating an image;
   projection means for projecting the image illuminated by said illumination means onto a predetermined surface;
   reflection means arranged between said projection means and said predetermined surface;
   reading means for reading image information of the image projected by said projection means and deflected by said reflection means, an optical path length between said reading means and said reflection means being equal to an optical path length between said reflection means and said predetermined surface; and
   image processing means for processing the image information read by said reading means, wherein said reflection means and said reading means are arranged adjacent to said predetermined surface.

7. An apparatus according to claim 6, wherein said reflection means and said reading means are integrally arranged.

8. An image information processing apparatus, comprising:
- illumination means for illuminating an image;
- projection means for projecting the image illuminated by said illumination means onto a predetermined surface;
- reflection means arranged between said projection means and said predetermined surface;
- reading means for reading image information of the image projected by said projection means and deflected by said reflection means, an optical path length between said reading means and the image being equal to an optical path length between the image and said predetermined surface; and
- image processing means for processing the image information read by said reading means, wherein said reflection means and said reading means are arranged adjacent to said predetermined surface.

9. An apparatus according to claim 8, wherein said reflection means and said reading means are integrally arranged.

10. An image information processing apparatus comprising;
- illuminating means for illuminating an image;
- projection means for projecting the image illuminated by said illumination means;
- a screen surface which the image is projected onto by said projection means;
- reading means for reading image information of the image projected by said projection means, said reading means arranged adjacent to said screen surface;
- image processing means for processing the image information read by said reading means; and
- projection position change means for changing a projection position of the image projected by said projection means,
- wherein when the image is projected at a first position by said projection position change means, the image is projected onto a screen surface by said projection means, and
- when the image is projected at a second position different from the first position by said projection position change means, said reading means reads image information of the image projected by said projection means.

11. An image information processing method comprising the steps of:
- causing illumination means to illuminate an image;
- causing projection means to project an image illuminated by said illumination means onto a predetermined surface;
- arranging reflection means between said projection means and said predetermined surface;
- causing reading means arranged adjacent to said predetermined surface to read image information of the image projected by said projection means and deflected by said reflection means; and
- causing image processing means to process the image information read by said reading means,
- wherein an optical path length between said reading means and said reflection means is equal to an optical path length between said reflection means and said predetermined surface.

12. An image information processing method comprising the steps of:
- causing illumination means to illuminate an image;
- causing projection means to project an image illuminated by said illumination means onto a predetermined surface;
- arranging reflection means between said projection means and said predetermined surface;
- causing reading means arranged adjacent to said predetermined surface to read image information of the image projected by said projection means and deflected by said reflection means; and
- causing image processing means to process the image information read by said reading means,
- wherein an optical path length between said reading means and the image is equal to an optical path length between the image and said predetermined surface.

13. An image information reading method comprising the steps of:
- causing illumination means to illuminate an image;
- causing projection means to project an image illuminated by said illumination means onto a predetermined surface;
- arranging reflection means between said projection means and said predetermined surface; and
- causing reading mans arranged adjacent to said predetermined surface to read image information of the image projected by said projection means and deflected by said reflection means,
- wherein an optical path length between said reading means and said reflection means is equal to an optical path length between said reflection means and said predetermined surface.

14. An image information reading method comprising the steps of:
- causing illumination means to illuminate an image;
- causing projection means to project an image illuminated by said illumination means onto a predetermined surface;
- arranging reflection means between said projection means and said predetermined surface; and
- causing reading means arranged adjacent to said predetermined surface to read image information of the image projected by said projection means and deflected by said reflection means,
- wherein an optical path length between said reading means and the image is equal to an optical path length between the image and said predetermined surface.

15. An image reading apparatus according to claim 5, wherein said projection position change means is arranged adjacent to said screen surface.

16. An image information processing apparatus according to claim 10, wherein said projection change means is arranged adjacent to said screen surface.

17. An image information reading method comprising the steps of:
- causing illumination means to illuminate an image;
- causing projection means to project an image illuminated by said illumination means onto a predetermined surface;
- arranging reflection means adjacent to said predetermined surface; and
- causing reading means arranged adjacent to said predetermined surface to read image information of the image projected by said projection means and deflected by said reflection means,
- wherein an optical path length between said reading means and said reflection means is equal to an optical path length between said reflection means and said predetermined surface.

18. An image information reading method comprising the steps of:
    causing illumination means to illuminate an image;
    causing projection means to project an image illuminated by said illumination means onto a predetermined surface;
    arranging reflection means adjacent to said predetermined surface; and
    causing reading means arranged adjacent to said predetermined surface to read image information of the image projected by said projection means and deflected by said reflection means,
    wherein an optical path length between said reading means and the image is equal to an optical path length between the image and said predetermined surface.

19. An image information processing method comprising the steps of:
    causing illumination means to illuminate an image;
    causing projection means to project an image illuminated by said illumination means onto a predetermined surface;
    arranging reflection means adjacent to said predetermined surface;
    causing reading means arranged adjacent to said predetermined surface to read image information of the image projected by said projection means and deflected by said reflection means, and
    causing image processing means to process the image information read by said reading means,
    wherein an optical path length between said reading means and said reflection means is equal to an optical path length between said reflection means and said predetermined surface.

20. An image information processing method comprising the steps of:
    causing illumination means to illuminate an image;
    causing projection means to project an image illuminated by said illumination means onto a predetermined surface;
    arranging reflection means adjacent to said predetermined surface;
    causing reading means arranged adjacent to said predetermined surface to read image information of the image projected by said projection means and deflected by said reflection means, and
    causing image processing means to process the image information read by said reading means,
    wherein an optical path length between said reading means and the image is equal to an optical path length between the image and said predetermined surface.

* * * * *